United States Patent
Dengel et al.

(10) Patent No.: US 9,014,909 B1
(45) Date of Patent: Apr. 21, 2015

(54) SYSTEMS AND METHODS FOR DIAGNOSING A FAULT STATE OF A SHIFT LINKAGE IN A MARINE PROPULSION DEVICE

(71) Applicant: Brunswick Corporation, Lake Forest, IL (US)

(72) Inventors: Michael P. Dengel, Fond du Lac, WI (US); Gene A. Smedema, Princeton, WI (US); Lance W. Ziemer, Van Dyne, WI (US)

(73) Assignee: Brunswick Corporation, Lake Forest, IL (US)

( * ) Notice: Subject to any disclaimer, the term of this patent is extended or adjusted under 35 U.S.C. 154(b) by 142 days.

(21) Appl. No.: 13/760,870

(22) Filed: Feb. 6, 2013

(51) Int. Cl.
  *F16H 61/00* (2006.01)
  *G01M 17/00* (2006.01)
(52) U.S. Cl.
  CPC ..................................... *G01M 17/00* (2013.01)
(58) Field of Classification Search
  USPC .................. 440/1, 75, 84, 87; 701/21, 51, 62
  See application file for complete search history.

(56) References Cited

U.S. PATENT DOCUMENTS

| | | | |
|---|---|---|---|
| 4,257,506 A | 3/1981 | Bankstahl | |
| 4,753,618 A | 6/1988 | Entringer | |
| 4,843,914 A | 7/1989 | Koike | |
| 4,843,915 A | 7/1989 | Sugimura et al. | |
| 4,903,662 A | 2/1990 | Hirukawa et al. | |
| 4,952,181 A | 8/1990 | Entringer et al. | |
| 4,986,776 A | 1/1991 | Hensel et al. | |
| 5,050,461 A | 9/1991 | Onoue et al. | |
| 5,827,150 A | 10/1998 | Mukumoto | |
| 5,853,306 A | 12/1998 | Worth et al. | |
| 6,273,771 B1 | 8/2001 | Buckley et al. | |
| 6,544,083 B1 | 4/2003 | Sawyer et al. | |
| 6,692,320 B1 | 2/2004 | Sawyer | |
| 6,929,518 B1 | 8/2005 | Sawyer et al. | |
| 6,942,530 B1 | 9/2005 | Hall et al. | |
| 7,214,164 B2 | 5/2007 | Shomura et al. | |
| 2008/0028879 A1* | 2/2008 | Robinette et al. | 74/335 |

* cited by examiner

*Primary Examiner* — Adam Tissot
(74) *Attorney, Agent, or Firm* — Andrus Intellectual Property Law, LLP

(57) ABSTRACT

A system and method are for diagnosing a fault state of a shift linkage in a marine propulsion device. A control lever is movable towards at least one of a maximum reverse position and a maximum forward position. A shift linkage couples the control lever to a transmission, wherein movement of the control lever causes movement of the shift linkage that enacts a shift change in the transmission. A shift sensor outputs a position signal representing a current position of the shift linkage. A control circuit diagnoses a fault state of the shift linkage when after the shift change the position signal that is output by the shift sensor is outside of at least one range of position signals that is stored in the control circuit.

20 Claims, 10 Drawing Sheets

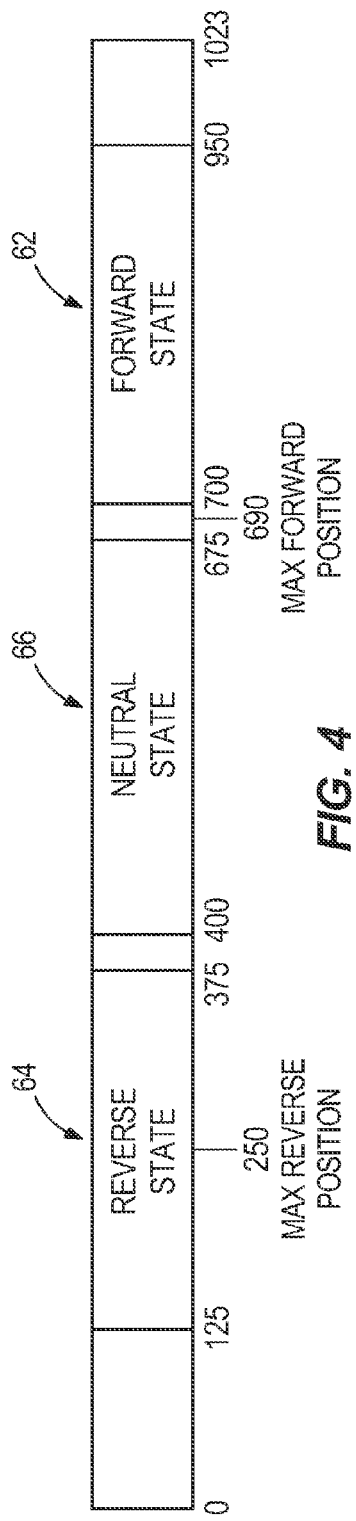
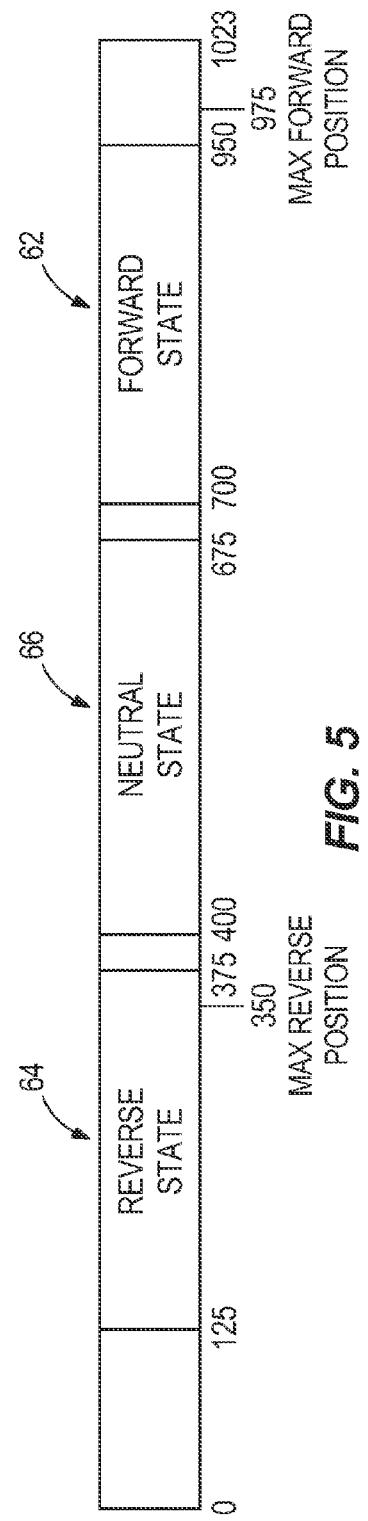

SYSTEMS AND METHODS FOR DIAGNOSING A FAULT STATE OF A SHIFT LINKAGE IN A MARINE PROPULSION DEVICE

FIELD

The present disclosure relates to marine propulsion devices, and more particularly to systems and methods for controlling shift in marine propulsion devices.

BACKGROUND

U.S. Pat. No. 4,753,618, the disclosure of which is incorporated herein by reference in entirety, discloses a shift cable assembly for a marine drive that includes a shift plate, a shift lever pivotally mounted on the plate, and a switch actuating arm pivotally mounted on the plate between a first neutral position and a second switch actuating position. A control cable and drive cable interconnect the shift lever and switching actuating arm with a remote control and clutch and gear assembly for the marine drive so that shifting of the remote control by a boat operator moves the cables to pivot the shift lever and switch actuating arm which in turn actuates a shift interrupter switch mounted on the plate to momentarily interrupt ignition of the drive unit to permit easier shifting into forward, neutral and reverse gears. A spring biases the arm into its neutral position and the arm includes an improved mounting for retaining the spring in its proper location on the arm.

U.S. Pat. No. 4,952,181, the disclosure of which is incorporated herein by reference in entirety, discloses a shift cable assembly for a marine drive having a clutch and gear assembly, including a remote control for selectively positioning the clutch and gear assembly into forward, neutral and reverse, a control cable connecting the remote control to a shift lever pivotally mounted on a shift plate, a drive cable connecting the shift lever on the shift plate to the clutch and gear assembly, and a spring guide assembly with compression springs biased to a loaded condition by movement of the remote control from neutral to forward and also biased to a loaded condition by movement of the remote control from neutral to reverse. The bias minimizes chatter of the clutch and gear assembly upon shifting into gear, and aids shifting out of gear and minimizes slow shifting out of gear and returns the remote control to neutral, all with minimum backlash of the cables. The spring guide assembly includes an outer tube mounted to the shift plate, and a spring biased plunger axially reciprocal in the outer tube and mounted at its outer end to the shift lever.

U.S. Pat. No. 4,986,776, the disclosure of which is incorporated herein by reference in entirety, discloses a shift speed equalizer in a marine transmission in a marine drive subject to a decrease in engine speed upon shifting from neutral to a forward or reverse gear due to a high propeller pitch or the like, such as in bass boat applications, and subject to an increase in engine speed upon shifting back to neutral. The shift from neutral to forward or reverse is sensed, and engine speed is increased in response thereto, to compensate the decrease in engine speed due to shifting. The return shift back to neutral is sensed, and engine speed is decreased in response thereto, to compensate the increase in engine speed due to shifting. Engine speed is increased by advancing engine spark ignition timing, and engine speed is decreased by retarding or returning engine ignition timing to its initial setting. Particular methodology and structure is disclosed, including modifications to an existing shift plate and to an existing guide block to enable the noted functions, and including the addition of an auxiliary circuit to existing ignition circuitry enabling the desired altering of engine ignition timing to keep engine speed from dropping when shifting into forward or reverse.

U.S. Pat. No. 6,273,771, the disclosure of which is incorporated herein by reference in entirety, discloses a control system for a marine vessel incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,544,083, the disclosure of which is incorporated herein by reference in entirety, discloses a gear shift mechanism in which a cam structure comprises a protrusion that is shaped to extend into a channel formed in a cam follower structure. The cam follower structure can be provided with first and second channels that allow the protrusion of the cam to be extended into either which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

U.S. Pat. No. 6,929,518, the disclosure of which is incorporated herein by reference in entirety, discloses a shifting apparatus for a marine propulsion device that incorporates a magnetoclastic elastic sensor which responds to torque exerted on the shift shaft of the gear shift mechanism. The torque on the shift shaft induces stress which changes the magnetic characteristics of the shift shaft material and, in turn, allows the magnetoelastic sensor to provide appropriate output signals representative of the torque exerted on the shift shaft. This allows a microprocessor to respond to the onset of a shifting procedure rather than having to wait for actual physical movement of the components of the shifting device.

U.S. Pat. No. 6,942,530, the disclosure of which is incorporated herein by reference in entirety, discloses an engine control strategy for a marine propulsion system that selects a desired idle speed for use during a shift event based on boat speed and engine temperature. In order to change the engine operating speed to the desired idle speed during the shift event, ignition timing is altered and the status of an idle air control valve is changed. These changes to the ignition timing and the idle air control valve are made in order to achieve the desired engine idle speed during the shift event. The idle speed during the shift event is selected so that the impact shock and resulting noise of the shift event can be decreased without causing the engine to stall.

U.S. Pat. No. 7,214,164, the disclosure of which is incorporated herein by reference in entirety, discloses shift operation control system for an outboard motor, which is capable of reducing a load acting on a shift operation lever during a shift operation and a shock occurring during the shift operation, to thereby facilitate the shift operation. The shift operation by the shift operation lever is continuously detected by a shift position detector, and when an early stage of the shift operation from the forward position to the neutral position or from the reverse position to the neutral position is detected and at the same time the engine speed at the detection is not less than a predetermined value, engine output reduction control is carried out, and when the shift position detector (24) detects that the shift position has been switched to the neutral position, the engine output reduction control is canceled.

U.S. patent application Ser. No. 13/462,570, filed May 2, 2012, the disclosures of which are incorporated herein by reference in entirety, discloses systems and methods for controlling shift in a marine propulsion device. A shift sensor outputs a position signal representing a current position of a shift linkage. A control circuit is programmed to identify an impending shift change when the position signal reaches a first threshold and an actual shift change when the position signal reaches a second threshold. The control circuit is programmed to enact a shift interrupt control strategy that facilitates the actual shift change when the position signal reaches the first threshold, and to actively modify the first threshold as a change in operation of the marine propulsion device occurs.

SUMMARY

This Summary is provided to introduce a selection of concepts that are further described below in the detailed description. This Summary is not intended to identify key or essential features of the claimed subject matter, nor is it intended to be used as an aid in limiting the scope of the claimed subject matter.

In some examples, methods of diagnosing a fault state of a shift linkage in a marine propulsion device comprise (1) moving a control lever towards at least one of a maximum reverse position and a maximum forward position, wherein movement of the control lever causes movement of a shift linkage, which enacts a shift change in a transmission; (2) sensing position of the shift linkage with a shift sensor, and outputting a position signal to a control circuit, the position signal representing a current position of the shift linkage; and (3) diagnosing with the control circuit a fault state of the shift linkage when after the shift change the position signal that is output by the shift sensor is outside of at least one range of position signals that is stored in the control circuit.

In some examples, systems are for diagnosing a fault state of a shift linkage in a marine propulsion device. A control lever is movable towards at least one of a maximum reverse position and a maximum forward position. A shift linkage couples the control lever to a transmission, wherein movement of the control lever causes movement of the shift linkage, which enacts a shift change in the transmission. A shift sensor outputs a position signal representing a current position of the shift linkage. A control circuit diagnoses a fault state of the shift linkage when after the shift change the position signal that is output by the shift sensor is outside of at least one range of position signals that is stored in the control circuit.

In some examples, the shift change comprises a change between a neutral gear and one of a forward gear and reverse gear. A potentiometer outputs an analog-to-digital count (ADC) representing a current position of the shift cable. A control circuit diagnoses a fault state of the shift cable when after the shift change, during movement of the control lever towards the at least one of the maximum reverse position and the maximum forward position, the ADC that is output by the potentiometer is outside of at least one range of ADCs that is stored in the control circuit. The control circuit controls an alert device to indicate the fault state to an operator.

In some examples, the at least one stored range of ADCs comprises a forward range in which the shift cable is expected to enact the change from the neutral gear to the forward gear, a reverse range in which the shift cable is expected to enact a change from the neutral gear to the reverse gear, and a neutral range that is in between the forward range and the reverse range, wherein in the neutral range the shift cable is expected to enact a change from the forward gear to the neutral gear and from the reverse gear to the neutral gear.

In some examples, the control circuit can diagnose a "forward offset fault state" of the shift cable indicating that the shift cable has shifted towards the forward gear when upon movement of the control lever towards the maximum reverse position the potentiometer outputs an ADC that is between the neutral range and the reverse range, and upon movement of the control lever towards the maximum forward position the potentiometer outputs an ADC that is outside of the forward range and not between the neutral range and the forward range.

In some examples, the control circuit can diagnose a "reverse offset fault state" of the shift cable indicating that the shift cable has shifted towards the reverse gear when upon movement of the control lever towards the maximum reverse position the potentiometer outputs an ADC that is outside of the reverse range and not between the neutral range and the reverse range, and upon movement of the control lever towards the maximum forward position the potentiometer outputs an ADC that is between the neutral range and the forward range.

In some examples, the control circuit can compare a first ADC from a movement of the control lever towards one of the maximum forward position and maximum reverse position to a second ADC from a second movement of the control lever towards the one of the maximum forward position and maximum reverse position. The control circuit can diagnose a "drift fault state" of the shift cable indicating that the shift cable has drifted when the first and second ADCs differ by more than a threshold amount.

In some examples, the control circuit recalibrates the at least one range of ADCs based upon when the shift change between the neutral gear and the forward and reverse gears, respectively, actually occurs.

Various other aspects and exemplary combinations for these examples are further described herein below.

BRIEF DESCRIPTION OF THE DRAWINGS

Examples of methods and systems for diagnosing a fault state in a shift linkage in marine propulsion device are described with reference to the following figures. The same numbers are used throughout the figures to reference like features and components.

FIGS. 2-8 are state flow diagrams depicting states of a shift control system.

DETAILED DESCRIPTION OF THE DRAWINGS

In the present description, certain terms have been used for brevity, clearness and understanding. No unnecessary limitations are to be inferred therefrom beyond the requirement of the prior art because such terms are used for descriptive purposes only and are intended to be broadly construed. The different methods and systems described herein may be used alone or in combination with other methods and systems. Various equivalents, alternatives, and modifications are possible within the scope of the appended claims.

Figure 1:
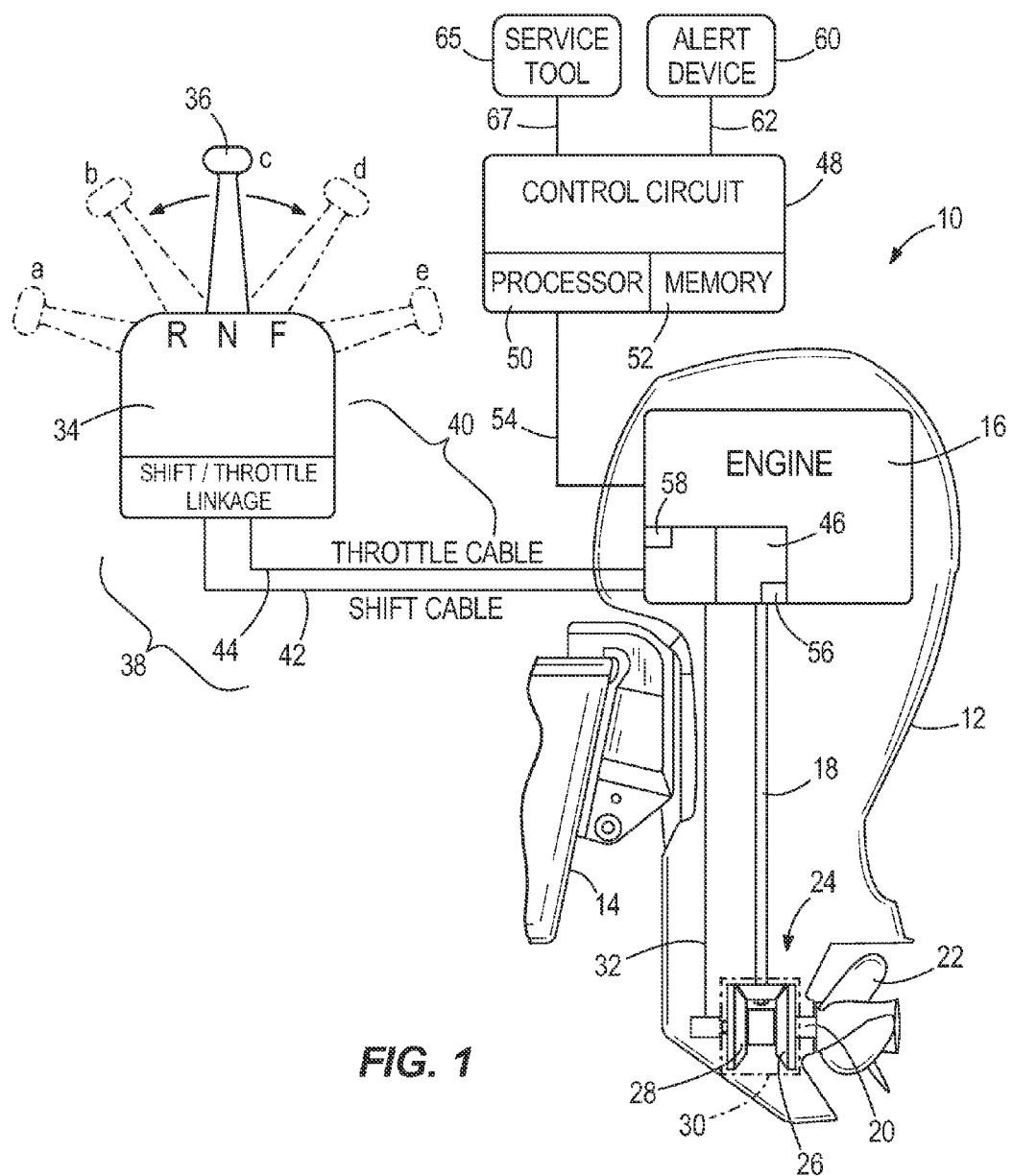
FIG. 1 is a schematic view of a system for diagnosing a fault state in a shift linkage.

FIG. 1 depicts an exemplary shift control system 10 for a marine propulsion device 12 on a marine vessel 14. In the examples shown and described, the marine propulsion device 12 is an outboard motor; however the concepts of the present disclosure are not limited for use with outboard motors and can be implemented with other types of marine propulsion devices, such as inboard motors, inboard/outboard motors, hybrid electric marine propulsion systems, pod drives and/or the like. In the examples shown and described, the marine propulsion device 12 has an engine 16 causing rotation of a driveshaft 18 to thereby cause rotation of a propeller shaft 20. A propeller 22 connected to and rotating with the propeller shaft 20 propels the marine vessel 14 to which the marine propulsion device 12 is connected. The direction of rotation of the propeller shaft 20 and propeller 22 is changeable by a transmission 24, which includes forwardly and rearwardly rotating gears 26, 28 connected to the propeller shaft 20 and a clutch 30, which in the example shown is a conventional dog clutch; however many other types of clutches can instead or also be employed. As is conventional, the clutch 30 is actuated between a forward gear position, neutral gear position and reverse gear position by a shift rod 32.

The shift control system 10 also includes a remote control 34 having an operator control lever 36, which in the example of FIG. 1 is a conventional combination shift/throttle lever that is pivotally moveable between a maximum reverse (wide open) throttle position 36a, a reverse detent position (zero throttle) 36b, a neutral position 36c, a forward detent position (zero throttle) 36d, and a maximum forward (wide open) throttle position 36e. The remote control 34 is typically located at the helm of the marine vessel 14. The control lever 36 is operably connected to a shift linkage 38 and a throttle linkage 40, such that pivoting movement of the control lever 36 can cause corresponding movement of the shift linkage 38 and such that pivoting movement of the control lever 36 can cause corresponding movement of the throttle linkage 40. Portions of the shift and throttle linkages 38, 40 are often located at the remote control 34 and other portions of the shift and throttle linkages 38, 40 are often located at the engine 16 of the marine propulsion device 12. The shift linkage 38 includes a shift cable 42 that translates movement of the control lever 36 to the marine propulsion device 12, and ultimately to a shift plate and the shift rod 32, for causing a shift event (i.e. a change in gear) in the transmission 24 via clutch 30. The throttle linkage 40 includes a throttle cable 44 that translates movement of the control lever 36 to the engine 16 of the marine propulsion device 12, and particularly to change the position of a throttle valve 46 of the engine 16, as is conventional. The shift and throttle linkages 38, 40 are conventional mechanical connections, examples of which are disclosed in the incorporated U.S. Pat. Nos. 4,753,618; 4,952,181; 4,986,776; 6,544,083; 6,929,518; 6,942,530 and 7,214,164.

The shift control system 10 also includes a control circuit 48 that is programmable and includes a microprocessor 50 and a memory 52. The control circuit 48 can be located anywhere with respect to the shift control system 10 including remote from the shift control system 10 and can communicate with various components of the marine vessel 14 via wired and/or wireless communication links, as will be explained further herein below. The control circuit 48 can have one or more sections of microprocessor 50 that are located together or remote from each other in the shift control system 10 and/or remote from the system 10. Although FIG. 1 shows a single control circuit 48, the shift control system 10 can include more than one control circuit 48. For example, the shift control system 10 can have a control circuit 48 located at or near the control lever 36 and also can have a control circuit 48 located at or near the marine propulsion device 12. Each of the noted control circuits 48 can have one or more microprocessor sections, as discussed herein above. In one example, the control circuit 48 can be connected in signal communication with a serial communication bus and in communication with a plurality of input devices and output devices that each transmit messages to the serial communication bus for receipt by other devices, for example as disclosed in the incorporated U.S. Pat. No. 6,273,771. One example of such a serial communication bus is a CAN Kingdom network, as is disclosed in U.S. Pat. No. 6,273,771. These types of control systems are conventional and therefore are not discussed further herein for brevity.

In this example, the control circuit 48 communicates with one or more components of the marine propulsion device 12 via a communication link 54, which can be a wired or wireless link. Again, the control circuit 48 can be incorporated with the marine propulsion device 12 and/or separate therefrom. The control circuit 48 is thus capable of monitoring and controlling operational characteristics of the marine propulsion device 12 by sending and receiving control signals via the communication link 54. In this example, a throttle valve position sensor 56 senses the position of the throttle valve 46, which is movable between open and closed positions. The throttle valve position sensor 56 is a conventional device and in one example can be a Hall effect sensor, which can be commercially obtained. The throttle valve position sensor 56 provides position signals to the control circuit 48 via the link 54 so as to indicate the current position of the throttle valve 46 to the control circuit 48.

The control circuit 48 also receives position signals from a shift sensor 58, which outputs position signals representing a current position of the shift linkage 38 and further representative of a position of the shift cable 42. The control circuit 48 communicates with the shift sensor 58 via the communication link 54. In the example described herein below, the shift sensor 58 incorporates a potentiometer and electric converter, such as an analog to digital converter that outputs discrete analog to digital counts (ADCs) that each represent a position of the shift linkage 40. Such potentiometer and electronic converter combinations are known in the art and are commercially available for example from CTSC Corporation. Physical connection of a potentiometer to a shift linkage is shown here schematically because such connection is known in the art, for example in the incorporated U.S. Pat. No. 7,214,164.

An alert device 60 is also provided in communication with the control circuit 48 via a communication link 62, which can be wired and/or wireless. The alert device 60 can include any device for informing the operator of the shift control system 10 regarding an operational characteristic of the system 10. Examples of alert devices 60 include lights, audio speakers, video screens, touch screens, and/or the like. A service tool 65 can also be connected to the control circuit 48 during setup or servicing of the system 10 via communication link 67, which can be wired or wireless. The service tool 65 is a conventional mechanism such as a laptop computer containing programming and connection ports for interfacing with the control circuit 48, for example during startup and/or calibration of the shift control system 10 or during maintenance thereof. An example of such a service tool 65 is a Mercury Computer Diagnostic System CDS G3 provided by Mercury Marine.

Figure 2:
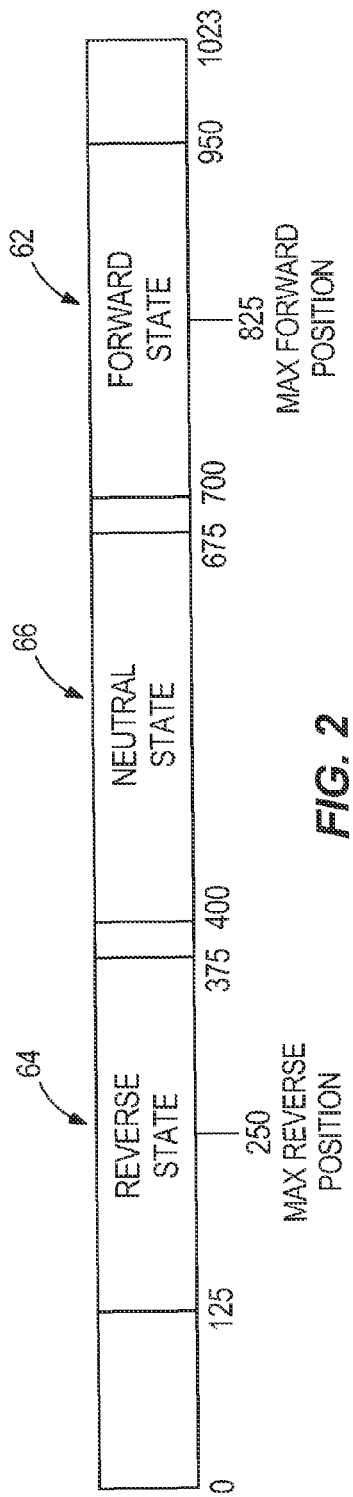

FIG. 2 is a state flow diagram depicting several different operational modes or "control states" or "control ranges" of the control circuit 48. In each control state or range, the control circuit 48 follows a protocol, as will be explained further herein below and in the incorporated U.S. patent application Ser. No. 13/462,570, to obtain a desired functional/operational output from the marine propulsion device 12 that is commensurate with operator inputs to the control lever 36.

The incorporated U.S. patent application Ser. No. 13/462,570 discloses a control circuit that is programmed to enact a selected "shift interrupt control strategy", which briefly lowers the speed of the engine when a position signal provided by a shift sensor reaches a threshold. As described in the incorporated application, the control circuit can also be programmed to actively modify one or more threshold as a change in operation of the marine propulsion device occurs, such as for example a change in a position of a throttle valve, as sensed by a throttle valve position sensor 56.

During further research and experimentation of shift control systems, the present inventors have determined that the control system described in the incorporated application Ser. No. 13/462,570 may not be able to properly control system activity, including for example the noted "shift interrupt control strategy" in situations where the shift linkage 38, and specifically noted shift cable 42 becomes out of a proper position alignment, becomes stretched, or is otherwise nonconforming with calibrated position limits. According to prior art arrangements, the way to determine whether a shift linkage/shift cable 38/42 is properly adjusted is by determining whether the gear position of the transmission 24 matches the input position of the control lever 36. The prior art is thus reactive in nature and does not provide advance warning to the operator that the shift linkage/shift cable 38/42 is out of adjustment and could potentially result in a future missed shift request entered by the operator via the control lever 36. Based on this recognition, the inventors have endeavored to provide a shift control system 10 that includes calibrated limits/ranges according to which the shift sensor 58 and control circuit 48 can alert the operator if for example the shift cable 42 is out of proper adjustment. The inventors have endeavored to provide a system 10 wherein the noted limits/ranges can be calibrated at setup of the system 10 and/or can be actively modified during operation thereof. Such a system 10 thus solves the noted problem of not being able to predict a potential missed shift event, and/or properly time a shift interrupt control strategy, as described in the incorporated U.S. patent application Ser. No. 13/462,570, due to for example the shift cable 42 being out of alignment. By incorporating the noted limits/ranges, the control circuit 48 can closely monitor the position of the shift cable 42 to ensure it remains within preset specifications. Once the shift linkage 38/shift cable 42 begins to move away from the preset specifications, the system 10 can be configured to alert the operator before a shift event or other control event is missed.

Referring to FIG. 2, a state flow diagram is provided showing output of the shift sensor 58, in this example the noted potentiometer, which outputs ADC values from 0 to 1023 representing movement of the shift cable 42 during movement of the control lever 36 between the reverse wide open throttle position 26a and forward wide open throttle position 26e. Movement of the control lever 36 causes movement of the shift linkage 38, including the shift cable 42, which in turn enacts shift changes in the transmission 24, namely changes between the noted reverse gear and a neutral gear and between a neutral gear and a forward gear. As shown in FIG. 2, at setup of the control system 10, an operator can calibrate into the control circuit 48 a plurality of ranges of position signals, stored in the memory 52 of the control circuit 48. In this example, the pluralities of ranges of position signals include a forward range 62, here 700 ADC-950 ADC, in which the shift linkage 38 is expected to enact the change from neutral gear to forward gear and thereafter stop moving at a "maximum forward position", a reverse range 64, here 125 ADC-375 ADC, in which the shift linkage 38 is expected to enact the change from neutral gear to the reverse gear and thereafter stop moving at a "maximum reverse position", and a neutral range 66, here 400 ADC-675 ADC, which is in between the forward range 62 and reverse range 66, and in which the shift linkage 38 is expected to enact the change from forward gear to neutral gear and from reverse gear to neutral gear.

As described in the incorporated U.S. patent application Ser. No. 13/462,570, the shift control system 10 has a mechanical set of linkages whereby manual inputs from the operator directly actuate the shift event or gear change. Thus, the control circuit 36 primarily has an observational role relative to the actual shifting event because the shifting event is largely controlled by mechanical connections in the marine propulsion device 12, including among other things the connections between the control lever 36, shift linkage 38, shift rod 32, transmission 24 and related clutch 30. However, the control circuit 48 can control characteristics of the engine 16 based upon the sensed operator inputs to the control lever 36 and more specifically based upon sensed movements of the shift linkage 28, for example. Mechanical tolerances and connections between the noted control lever 36, shift linkage 28, including shift cable 42, will vary for each marine propulsion device 12. Because of this variability, the noted ranges are programmed into the control circuit 48 at the time the shift control system 10 is initially configured, which ranges typically represent common or estimated positions of the shift linkage 38 at which a shift event most likely occurs, will not necessarily accurately reflect such a state in every system. The difference between the ranges that are programmed when the shift control system 10 is initially configured and the actual positions at which changes in shift states occur can vary. For example, the position of the shift linkage 38 will not always accurately and/or precisely predict and/or represent the position at which an actual shift event occurs at the transmission 24. Each system will have slightly different physical characteristics, which causes the correlation between the position of the control lever 36 and the actuation of clutch 30 to vary and be unpredictable at the time of initial configuration of the shift control system 10.

The control circuit 48 is, in some embodiments, programmed to recognize the occurrence of a shift event for example based upon movement of the throttle valve 46 between its closed and open state, which correlates to actual gear position of the marine propulsion device 12. By sensing the position of the throttle valve 46 and correlating throttle valve 46 position to an actual shift condition, the shift control system 10 is able to accurately identify a shift event occurrence. In other words, the throttle valve 46 will typically change position upon an actual shift event. This information therefore can be used by the control circuit 48 to identify the actual shift event occurrence. In other examples, the control circuit 48 can be programmed to identify an actual shift event occurrence by monitoring speed and load of the engine 16. In other words, the control circuit 48 can be programmed to assume that a shift event has occurred in the transmission 24 upon a change in speed and/or load of the engine 16 that is above a predetermined threshold.

In some examples, the control circuit 48 is configured to recalibrate the noted reverse, neutral and forward ranges 64, 66, 62 based upon the shift event occurrence. That is, the noted ranges of ADC counts are not static, but can be modified by the control circuit 48 based upon the actual occurrence of the shift event.

The control circuit 48 can further advantageously be configured to diagnose a fault state of the shift linkage 38, and particularly of the shift cable 42 when, after a shift change has occurred, as identified by the control circuit 48 by for example the methods described herein above, during movement of the control lever 36 towards one of the noted maximum reverse position and/or the maximum forward position, the position signal, here an ADC value, that is output by the shift sensor 58, here a potentiometer, is outside of the corresponding range of position signals (e.g. 62, 64, 66) stored in the memory 52 of the control circuit 48. When a fault state is identified by the control circuit 48, the control circuit 48 communicates it to the operator via the alert device 60. In some examples, the control circuit 48 can further be programmed to control the alert device 60 to indicate to an operator how to remedy the diagnosed fault state. For example, if the shift cable 42 is identified as being shifted towards the reverse state, the control circuit 48 can control the alert device 60 to instruct the operator how to remedy this situation through a mechanical adjustment. This same procedure can be employed for other fault states, such as a shift cable 42 that is shifted towards the forward state or a shift cable 44 that is unduly stretched.

Figure 3:
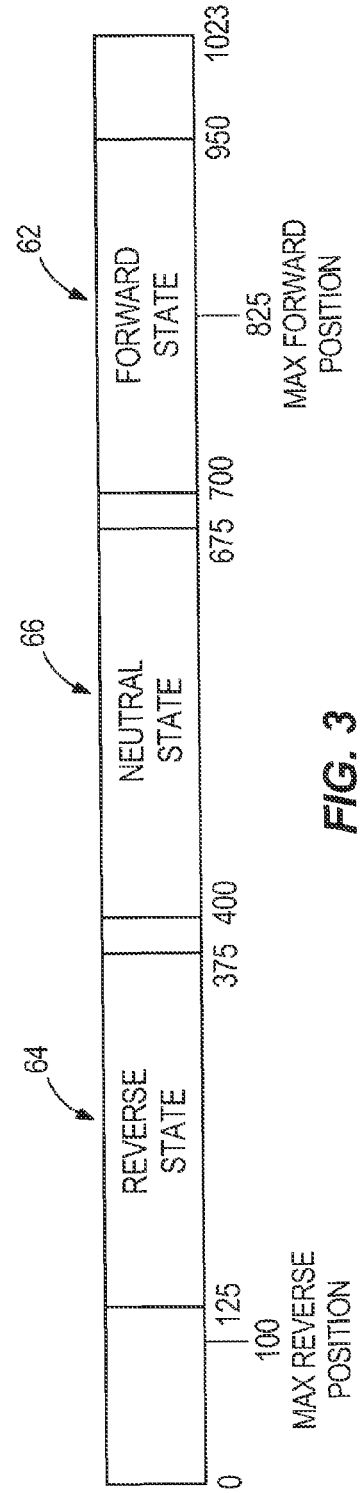

FIG. 3 depicts one example wherein the control circuit 48 diagnoses a fault state of the shift linkage 38 indicating that the maximum reverse position has a value of 100 ADC, which is outside of the reverse range 64.

FIG. 4 depicts an example wherein the control circuit 48 diagnoses a fault state of the shift linkage 38 when upon movement of the control lever 36 towards the maximum forward position, the shift sensor 58 outputs a maximum forward position value of 690 ADC, which is between the forward range 62 and neutral range 66.

FIG. 5 depicts an example wherein the control circuit 48 diagnoses a "forward offset fault state" of the shift linkage 38 indicating that the entire shift cable 42 has shifted towards the forward gear. In this example, upon movement of the control lever 36 towards the maximum reverse position, the shift sensor 58 outputs a first position signal, here 350 ADC, that is between the neutral range 66 and reverse range 64. Upon movement of the control lever 36 towards the maximum forward position, the shift sensor 58 outputs a second position signal, here 975 ADC, that is outside of the forward range 62 and not in between the neutral range 66 and the forward range 62.

Figure 6:
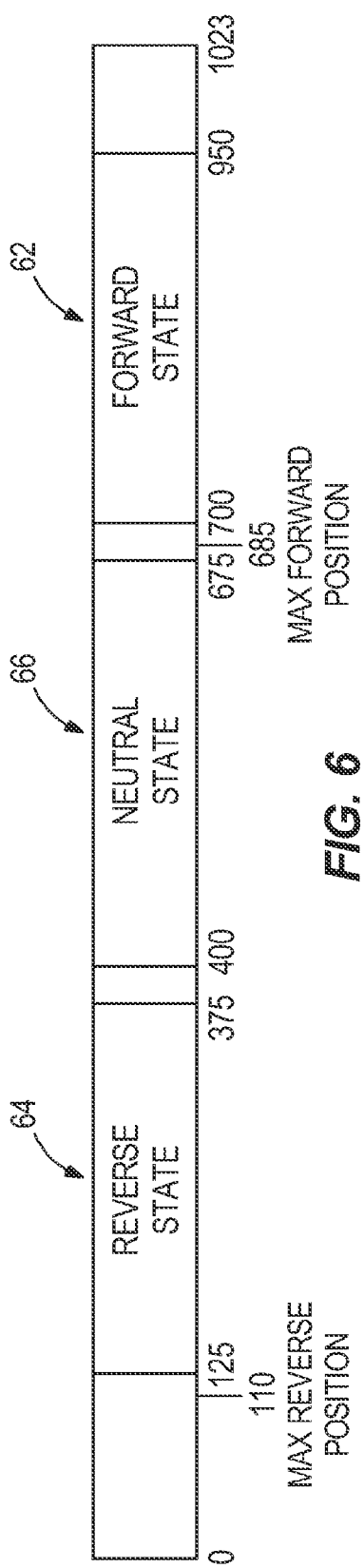

In FIG. 6, an example is shown wherein the control circuit 48 diagnoses a "reverse offset fault state" of the shift linkage 38 indicating that the entire shift cable 42 has shifted towards the reverse gear. In this example, upon movement of the control lever 36 towards the maximum reverse position, the shift sensor 58 outputs a first position signal, here 110 ADC that is outside of the reverse range 64 and not between the neutral range 66 and reverse range 64. Upon movement of the control lever 36 towards the maximum forward position, the shift sensor 58 outputs a second position signal, here 685 ADC, that is between the neutral range 66 and the forward range 62.

Figure 7:
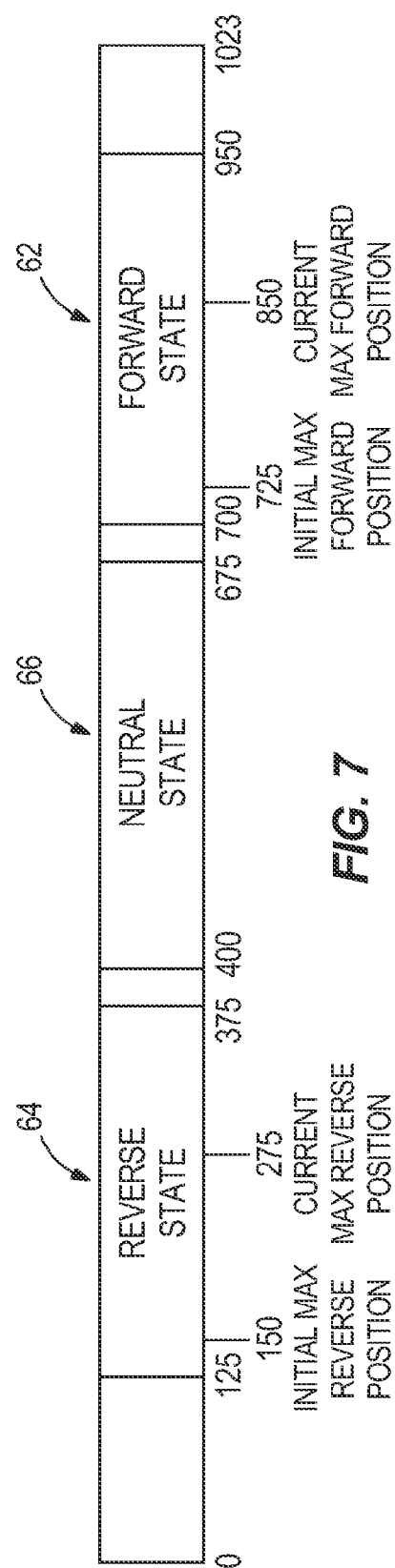

FIG. 7 depicts an example wherein the control circuit diagnoses a "drift fault state" of the shift linkage 38 indicating that the shift cable 42 has drifted. The control circuit 48 diagnoses the drift fault state when it compares a first position signal, here 150 ADC, from a movement of the control lever 36 towards one of the maximum forward position and maximum reverse position (here the maximum reverse position) to a second position signal, here 275 ADC, from a second movement of the control lever 36 towards the one of the maximum forward position and maximum reverse position (here the maximum reverse position). This same logic applies from a movement of the control lever toward the maximum forward position, here including first and second position signals of 850 ADC and 725 ADC, respectively.

Figure 8:
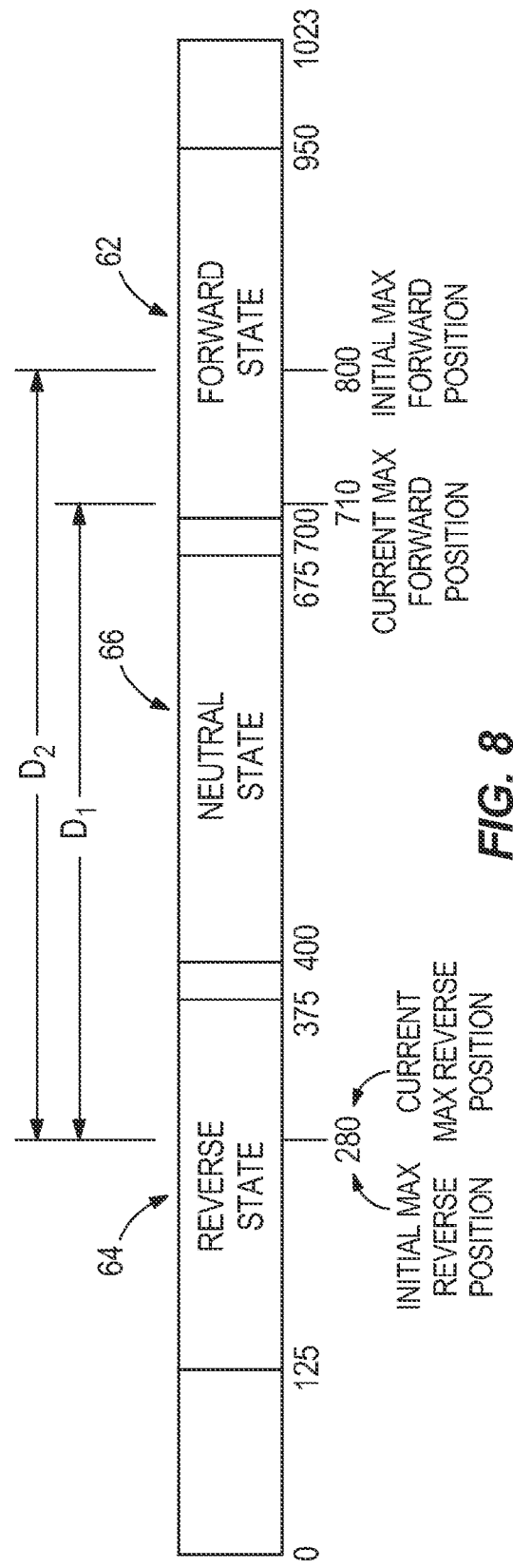

FIG. 8 depicts another example wherein the control circuit 48 diagnoses a "stretched shift linkage fault state" when the shift cable 42, does not move more than a threshold distance that is stored in the memory 52 of the control circuit 48. Here, the control circuit 48 compares the total distance D1 that the shift cable 42 moves during movement of the control lever 36 towards one of the maximum forward position and maximum reverse position to a stored distance D2. The control circuit 48 diagnoses a stretched shift linkage fault state if the shift linkage 38 does not move more than the stored threshold distance D2.

Figure 9:
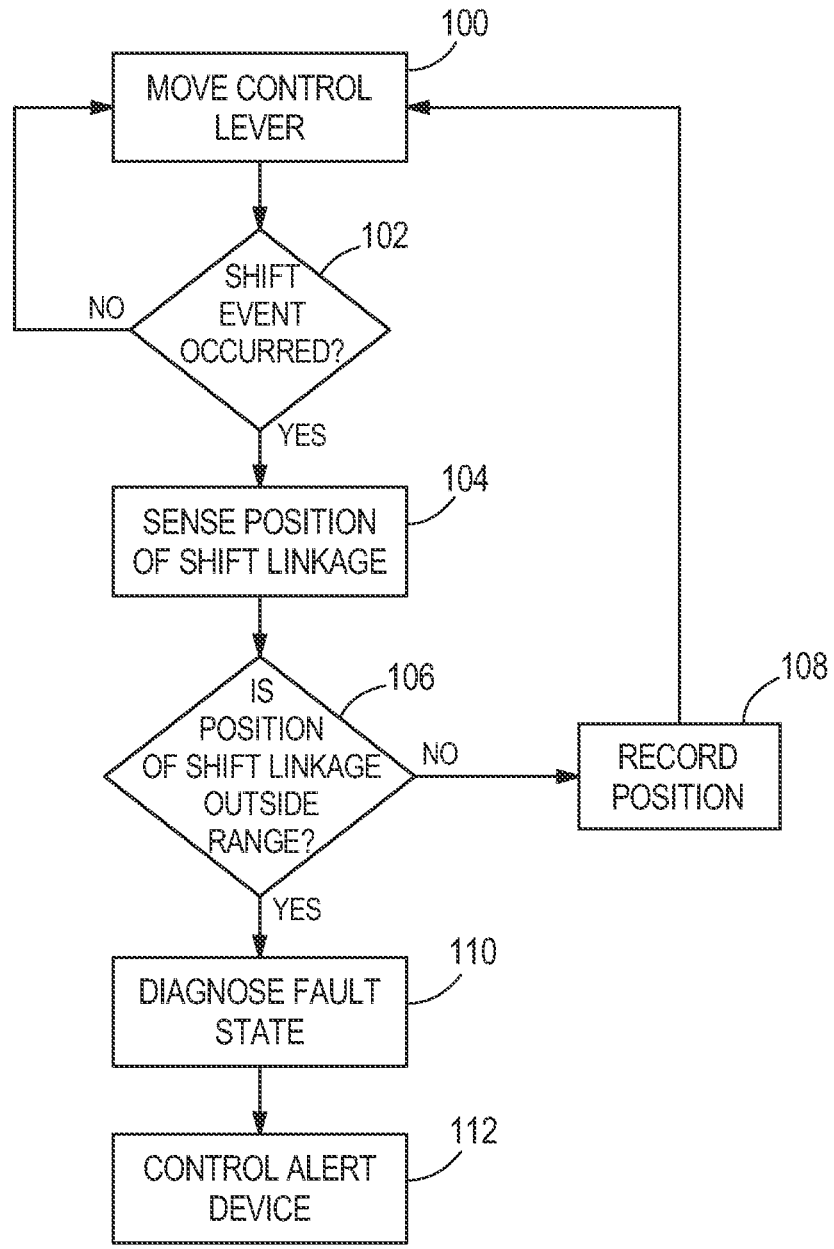
FIGS. 9-13 are flow charts showing steps of methods for diagnosing a fault state in a shift linkage.

FIG. 9 depicts one example of a method for diagnosing a fault state in a shift linkage 38. The method includes, at step 100, moving the control lever 36 towards at least one of the maximum reverse position and maximum forward position so that the control lever 36 causes movement of the shift linkage 38, which in turn enacts a shift change in the transmission 24 between either forward and neutral gears or reverse and neutral gears. At step 102, the control circuit 48 determines whether a shift event has occurred, by for example monitoring engine speed and load and/or throttle valve position, as described herein above. If no, the method returns to step 100. If yes, at step 104, the shift sensor 58 senses the position of the shift linkage 40, particularly the shift cable 42, and communicates this information to the control circuit 48. At step 106, the control circuit 48 determines whether the position communicated from the shift sensor 58 at step 104 is outside of a predetermined range, such as for example the ranges 62, 64, 66 described herein above. If no, at step 108, the control circuit 48 records the position that is sensed by the shift sensor 58 at step 104. If yes, at step 110, the control circuit 48 diagnoses a fault state. At step 112, the control circuit 48 controls the alert device 60 to inform the operator.

Figure 10:
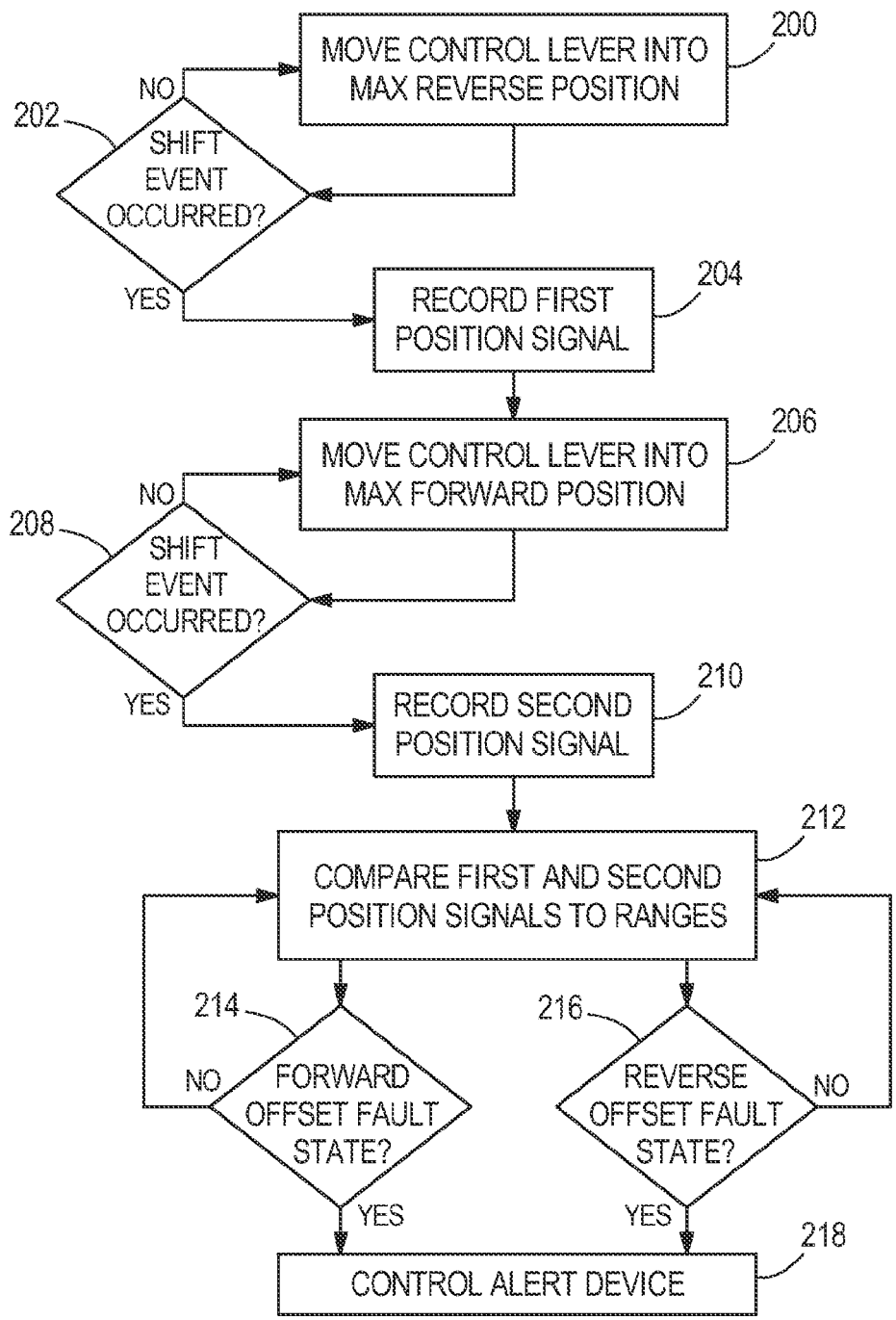

FIG. 10 depicts another example of a method of diagnosing a fault state in a shift linkage 38 in a marine propulsion device 12. The method includes, at step 200, moving a control lever 36 towards at least one of a maximum reverse position and a maximum forward position so that the control lever 36 causes movement of the shift linkage 38, which in turn enacts a shift change in the transmission 24. At step 202, the control circuit 48 determines whether a shift event has occurred by monitoring engine speed/load and/or throttle valve position, as described herein above. If no, the method returns to step 200. If yes, at step 204, the control circuit 48 records the position signal output by the shift sensor 58 at step 200. At step 206, the control lever 36 is moved towards the other of the maximum reverse position and maximum forward position, so that the control lever 36 causes movement of the shift linkage 38, which in turn enacts another shift change in the transmission 24. At step 208, the control circuit 48 determines whether a shift event has occurred. If no, the method returns to step 206. If yes, at step 210, the control circuit 48 records a second position signal output by the shift sensor 58 at step 206. Thereafter, at step 212, the control circuit 48 compares the first and second position signals to one or more ranges that are stored in the memory 52 of the control circuit 48. At step 214, the control circuit 48 determines whether there is a forward offset fault state, as described herein above with reference to FIG. 5. If no, the method returns to step 212. If yes, the method proceeds to step 218 wherein the control circuit 48 controls the alert device 60 to inform the operator of the forward offset fault state. At step 216, the control circuit 48 determines whether there is a reverse offset fault state, as described herein above regarding FIG. 6. If no, the method returns to step 212. If yes, the method proceeds to step 218.

Figure 11:
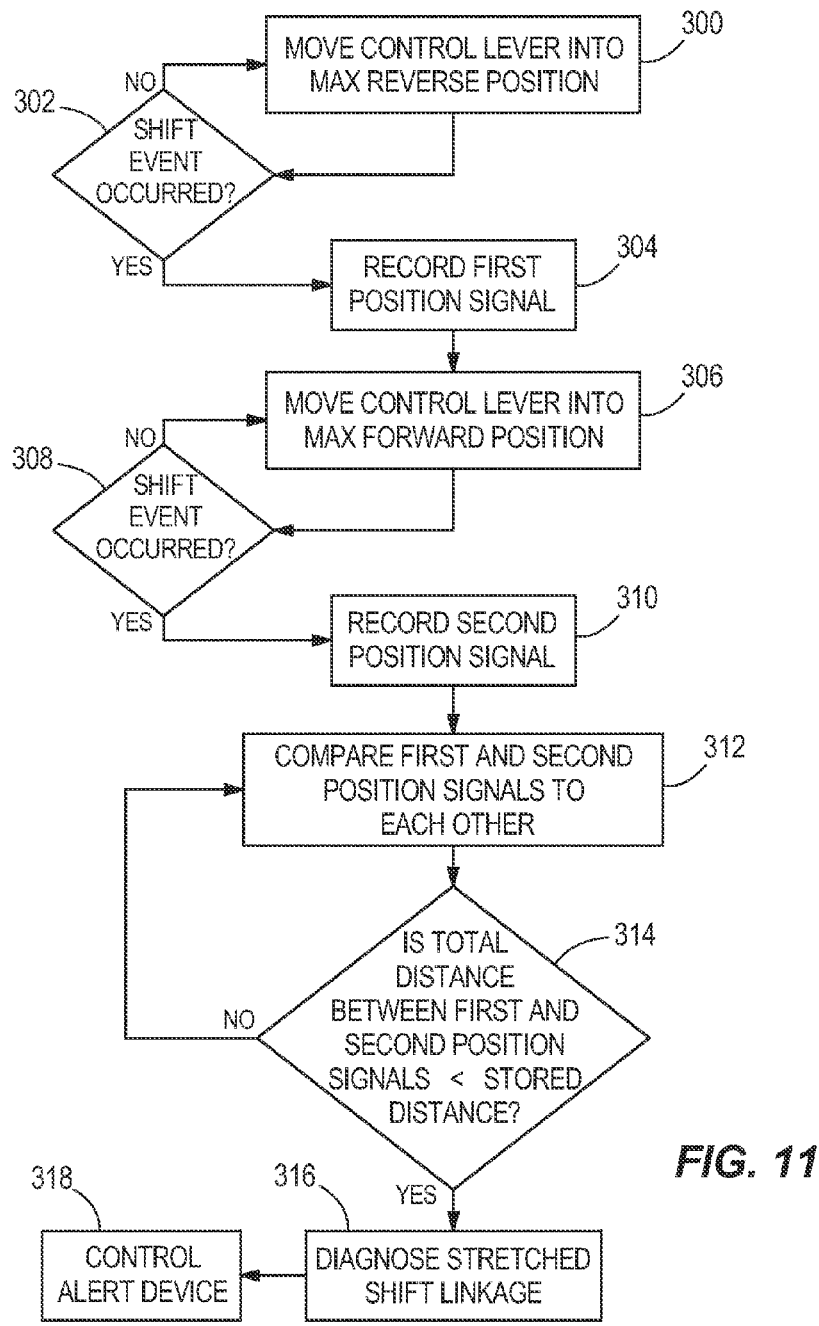

FIG. 11 depicts another example of a method for diagnosing a fault state in a shift linkage 38 in a marine propulsion device 12. At step 300, the control lever 36 is moved towards the maximum reverse position so that the control lever 36 causes movement of the shift linkage 38, which enacts a shift change in the transmission 24. At step 302, the control circuit 48 determines whether a shift event has occurred. If no, the method returns to step 300. If yes, at step 304, the shift sensor 58 provides a first position signal to the control circuit 48, which is recorded in the memory 52. At step 306, the control lever 36 is moved towards the maximum forward position so that the control lever 36 causes movement of the shift linkage 38, which enacts a shift change in the transmission 24. At step 308, the control circuit 48 determines whether a shift event has occurred. If no, the method returns to step 306. If yes, at step 310 the shift sensor 58 provides a second position signal, which is recorded in the memory 52 of the control circuit 48. At step 312, the control circuit 48 compares the first and second position signals to each other. At step 314, the control circuit 48 determines whether the distance between the first and second position signals is less than a distance stored in the memory 52 of the control circuit 48. If no, the method returns to step 312. If yes, at step 316, the control circuit 48 diagnoses a stretched shift linkage fault state. Thereafter at step 318, the control circuit 48 controls the alert device 60 to inform the operator of the stretched shift linkage fault state.

Figure 12:
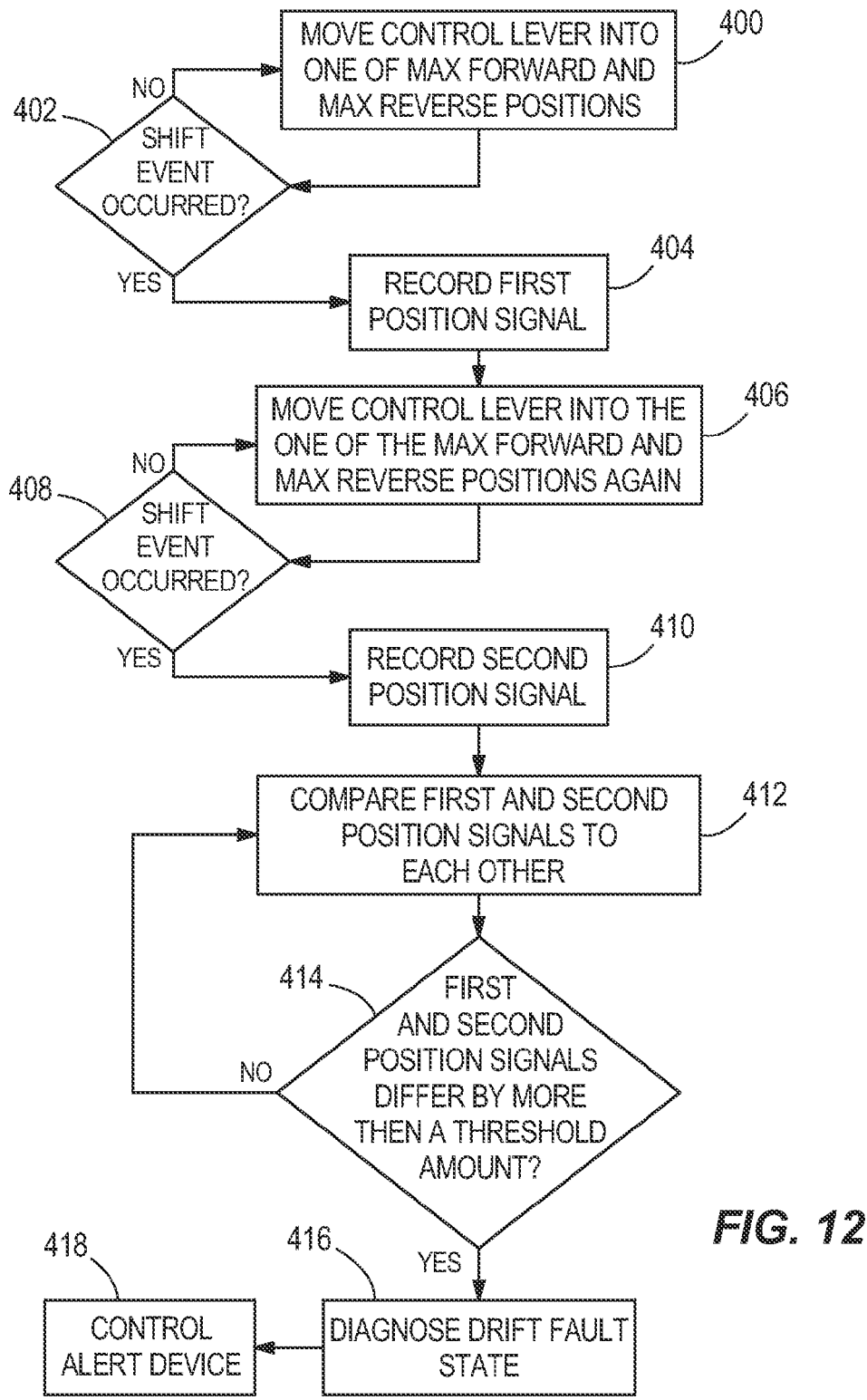

FIG. 12 depicts another example of a method of diagnosing a fault state in a shift linkage 38 in a marine propulsion device 12. The method includes at step 400, moving a control lever 36 towards at least one of a maximum reverse position and a maximum forward position so that the control lever 36 causes movement of the shift linkage 38, which in turn enacts a shift change in a transmission 24. At step 402, the control circuit 48 determines whether a shift event has occurred. If no, the method returns to step 400. If yes, at step 404, the control circuit 48 records a position signal output by the shift sensor 58. At step 406, the method includes moving the control lever 36 towards the other one of the maximum reverse position and maximum forward position so that the control lever 36 causes movement of the shift linkage 38, which in turn enacts a shift change in the transmission 24. At step 408, the control circuit 48 determines whether a shift event has occurred. If no, the method returns to step 406. If yes, at step 410, the control circuit 48 records a position signal output by the shift sensor 58. Thereafter, at step 412, the control circuit 48 compares the noted first and second position signals to each other. At step 414, the control circuit 48 determines whether the first and second position signals differ by more than a threshold amount. If no, the method returns to step 412. If yes, at step 416, the control circuit 48 diagnoses a drift fault state. At step 418, the control circuit 48 controls the alert device 60 to alert the operator of the drift fault state.

Figure 13:
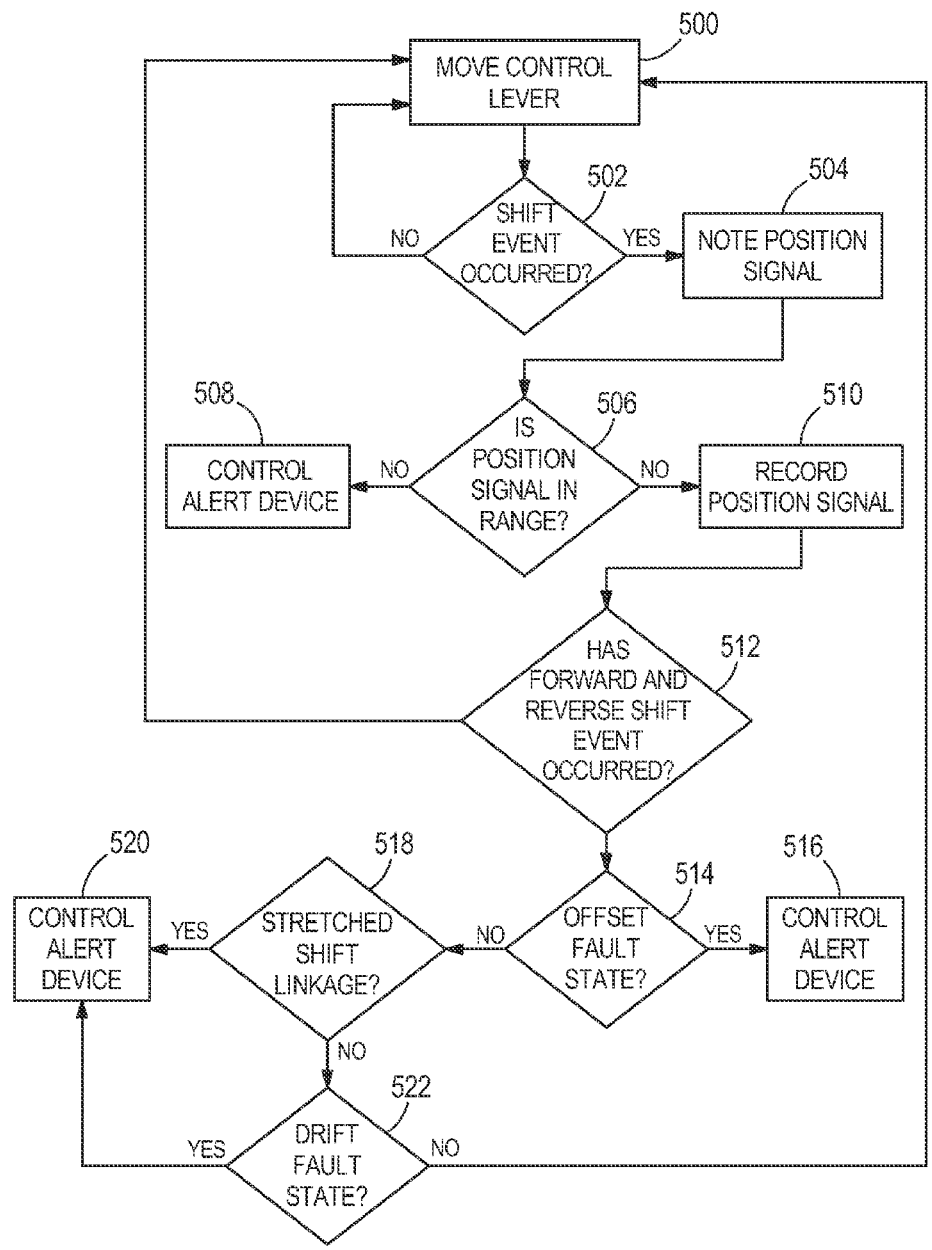

FIG. 13 depicts another example of a method of diagnosing a fault state in a shift linkage 38 in a marine propulsion device 12. The method includes, at step 500, moving a control lever 36 towards at least one of a maximum reverse position and a maximum forward position so that the control lever 36 causes movement of the shift linkage 40, which in turn enacts a shift change in the transmission 24. At step 502, the control circuit 48 determines whether a shift event has occurred. If no, the method returns to step 500. If yes, at step 504, the control circuit 48 notes a position signal output by the shift sensor 58.

At step 506, the control circuit 48 determines whether the position signal output by the shift sensor 58 at step 504 is within one of a plurality of stored ranges of position signals. If no, at step 508, the control circuit 48 controls the alert device 60 to inform the operator of the fault state of the shift linkage 40. If yes, at step 510, the control circuit 48 stores the position signal in the memory 52. At step 512, the control circuit 48 determines whether forward and reverse shift events have both occurred. If no, the method returns to step 500. If yes, at step 514, the control circuit 48 determines whether an offset fault state has occurred per the analysis described herein above regarding FIGS. 5 and 6. If yes, the control circuit 48 controls the alert device 60 to inform the operator regarding the offset fault state. If no, at step 518, the control circuit 48 determines whether a stretched shift linkage fault state has occurred, per the analysis described herein above regarding FIG. 8. If yes, at step 520, the control circuit 48 controls the alert device 60 to inform the operator regarding the fault state. If no, at step 522, the control circuit 48 determines whether a drift fault state has occurred, per the description herein above regarding FIG. 7. If yes, the method proceeds to step 520. If no, the method returns to step 500.

What is claimed is:

1. A method of diagnosing a fault state of a shift linkage in a marine propulsion device, the method comprising:
   moving a control lever towards at least one of a maximum reverse position and a maximum forward position so that the control lever causes movement of a shift linkage, which enacts a shift change in a transmission;
   sensing position of the shift linkage with a shift sensor and outputting a position signal to a control circuit, the position signal representing a current position of the shift linkage; and
   diagnosing with the control circuit a fault state of the shift linkage when after the shift change the position signal that is output by the shift sensor is outside of at least one range of position signals that is stored in the control circuit.

2. The method according to claim 1, comprising indicating the fault state to an operator via an alert device.

3. The method according to claim 2, comprising indicating to the operator how to remedy the fault state.

4. The method according to claim 1, wherein the shift change comprises a change between a neutral gear and one of a forward gear and reverse gear, and comprising calibrating in the control circuit the at least one stored range of position signals, wherein the at least one stored range of position signals comprises a forward range in which the shift linkage is expected to enact the change from the neutral gear to the forward gear, a reverse range in which the shift linkage is expected to enact a change from the neutral gear to the reverse gear, and a neutral range that is in between the forward range and the reverse range, wherein in the neutral range the shift linkage is expected to enact a change from the forward gear to the neutral gear and from the reverse gear to the neutral gear.

5. The method according to claim 4, comprising diagnosing with the control circuit a forward offset fault state of the shift linkage indicating that the shift linkage has shifted towards the forward gear when upon movement of the control lever towards the maximum reverse position the shift sensor outputs a first position signal that is between the neutral range and the reverse range, and upon movement of the control lever towards the maximum forward position the shift sensor outputs a second position signal that is outside of the forward range and not between the neutral range and the forward range.

6. The method according to claim 4, comprising diagnosing with the control circuit a reverse offset fault state of the shift linkage indicating that the shift cable has shifted towards the reverse gear when upon movement of the control lever towards the maximum reverse position the shift sensor outputs a first position signal that is outside of the reverse range and not between the neutral range and the reverse range, and upon movement of the control lever towards the maximum forward position the shift sensor outputs a second position signal that is between the neutral range and the forward range.

7. The method according to claim 4, comprising comparing a first position signal from a movement of the control lever towards one of the maximum forward position and maximum reverse position to a second position signal from a second movement of the control lever towards the one of the maximum forward position and maximum reverse position and diagnosing a drift fault state of the shift linkage indicating that the shift linkage has drifted when the first and second position signals differ by more than a threshold amount.

8. The method according to claim 4, comprising recalibrating the at least one range of position signals based upon when the shift change between the neutral gear and the forward and reverse gears, respectively, actually occurs.

9. The method according to claim 1, comprising comparing a total distance that the shift linkage moves during movement of the control lever between the maximum forward position and maximum reverse position to a stored distance, and diagnosing a stretched shift linkage fault state if the shift linkage does not move more than the stored distance.

10. A system for diagnosing a fault state of a shift linkage in a marine propulsion device, the system comprising:
- a control lever that is movable towards at least one of a maximum reverse position and a maximum forward position;
- a shift linkage that couples the control lever to a transmission, wherein movement of the control lever causes movement of the shift linkage, which enacts a shift change in the transmission;
- a shift sensor that outputs a position signal representing a current position of the shift linkage; and
- a control circuit that diagnoses a fault state of the shift linkage when after the shift change the position signal that is output by the shift sensor is outside of at least one range of position signals that is stored in the control circuit.

11. The system according to claim 10, comprising an alert device, wherein the control circuit controls the alert device to indicate the fault state to an operator.

12. The system according to claim 11, wherein the control circuit controls the alert device to indicate to an operator how to remedy the fault state.

13. The system according to claim 10, wherein the shift change comprises a change between a neutral gear and one of a forward gear and reverse gear.

14. The system according to claim 13, wherein the at least one stored range of position signals comprises a forward range in which the shift linkage is expected to enact the change from the neutral gear to the forward gear, a reverse range in which the shift linkage is expected to enact a change from the neutral gear to the reverse gear, and a neutral range that is in between the forward range and the reverse range, wherein in the neutral range the shift linkage is expected to enact a change from the forward gear to the neutral gear and from the reverse gear to the neutral gear.

15. The system according to claim 14, wherein the control circuit diagnoses a forward offset fault state of the shift linkage indicating that the shift linkage has shifted towards the forward gear when upon movement of the control lever towards the maximum reverse position the shift sensor outputs a first position signal that is between the neutral range and the reverse range, and upon movement of the control lever towards the maximum forward position the shift sensor outputs a second position signal that is outside of the forward range and not between the neutral range and the forward range.

16. The system according to claim 14, wherein the control circuit diagnoses a reverse offset fault state of the shift linkage indicating that the shift cable has shifted towards the reverse gear when upon movement of the control lever towards the maximum reverse position the shift sensor outputs a first position signal that is outside of the reverse range and not between the neutral range and the reverse range, and upon movement of the control lever towards the maximum forward position the shift sensor outputs a second position signal that is between the neutral range and the forward range.

17. The system according to claim 14, wherein the control circuit compares a first position signal from a movement of the control lever towards one of the maximum forward position and maximum reverse position to a second position signal from a second movement of the control lever towards the one of the maximum forward position and maximum reverse position and wherein the control circuit diagnoses a drift fault state of the shift linkage indicating that the shift linkage has drifted when the first and second position signals differ by more than a threshold amount.

18. The system according to claim 14, wherein the control circuit recalibrates the at least one range of position signals based upon when the shift change between the neutral gear and the forward and reverse gears, respectively, actually occurs.

19. The system according to claim 10, wherein the control circuit compares a total distance that the shift linkage moves during movement of the control lever towards at least one of the maximum forward position and maximum reverse position to a stored distance, and wherein the control circuit diagnoses a stretched shift linkage fault state if the shift linkage does not move more than the stored distance.

20. A system for diagnosing a fault state of a shift linkage in a marine propulsion device, the system comprising:
- a control lever that is movable towards at least one of a maximum reverse position and a maximum forward position;
- a shift cable that couples the control lever to a transmission, wherein movement of the control lever causes movement of the shift cable that enacts a shift change in the transmission, wherein the shift change comprises a change between a neutral gear and one of a forward gear and reverse gear;
- a potentiometer that outputs an analog-to-digital count (ADC) representing a current position of the shift cable;
- a control circuit that diagnoses a fault state of the shift cable when after the shift change, during movement of the control lever towards the at least one of the maximum reverse position and the maximum forward position, the ADC that is output by the potentiometer is outside of at least one range of ADCs that is stored in the control circuit; and
- an alert device, wherein the control circuit controls the alert device to indicate the fault state to an operator;
- wherein the at least one stored range of ADCs comprises a forward range in which the shift cable is expected to enact the change from the neutral gear to the forward gear, a reverse range in which the shift cable is expected to enact a change from the neutral gear to the reverse gear, and a neutral range that is in between the forward range and the reverse range, wherein in the neutral range the shift cable is expected to enact a change from the forward gear to the neutral gear and from the reverse gear to the neutral gear;

wherein the control circuit diagnoses a forward offset fault state of the shift cable indicating that the shift cable has shifted towards the forward gear when upon movement of the control lever towards the maximum reverse position the potentiometer outputs an ADC that is between the neutral range and the reverse range, and upon movement of the control lever towards the maximum forward position the potentiometer outputs an ADC that is outside of the forward range and not between the neutral range and the forward range;

wherein the control circuit diagnoses a reverse offset fault state of the shift cable indicating that the shift cable has shifted towards the reverse gear when upon movement of the control lever towards the maximum reverse position the potentiometer outputs an ADC that is outside of the reverse range and not between the neutral range and the reverse range, and upon movement of the control lever towards the maximum forward position the potentiometer outputs an ADC that is between the neutral range and the forward range;

wherein the control circuit compares a first ADC from a movement of the control lever towards one of the maximum forward position and maximum reverse position to a second ADC from a second movement of the control lever towards the one of the maximum forward position and maximum reverse position and wherein the control circuit diagnoses the drift fault state of the shift cable indicating that the shift cable has drifted when the first and second ADCs differ by more than a threshold amount; and wherein the control circuit recalibrates the at least one range of ADCs based upon when the shift change between the neutral gear and the forward and reverse gears, respectively, actually occurs.

* * * * *